Sept. 28, 1965 J. E. LARRISON 3,208,584
MINIATURE SEMICONDUCTOR DEVICE HOLDER
Filed Aug. 1, 1963
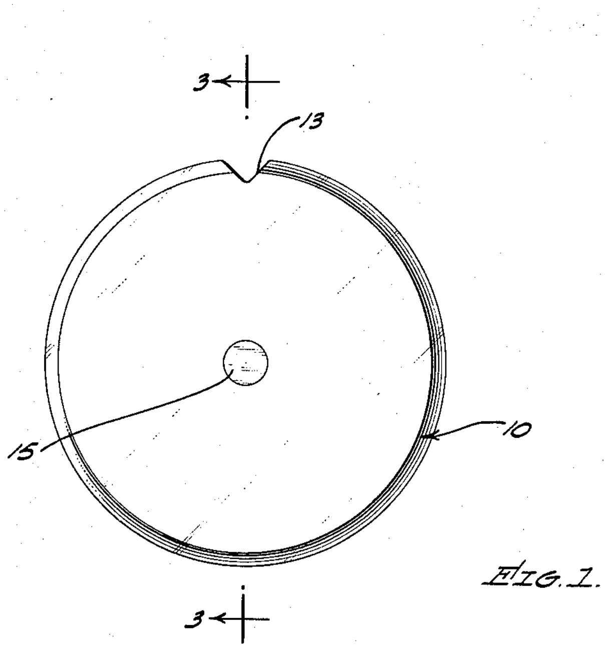
FIG. 1.
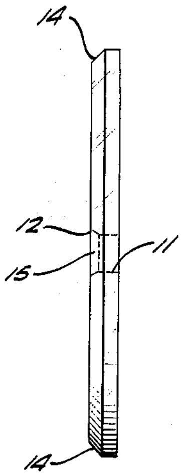
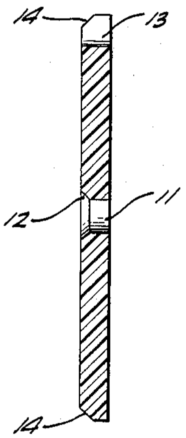
FIG. 2. FIG. 3.
INVENTOR.
JOHN E. LARRISON,
BY John M. Koch
ATTORNEY.

United States Patent Office
3,208,584
Patented Sept. 28, 1965

3,208,584

MINIATURE SEMICONDUCTOR DEVICE HOLDER

John E. Larrison, Costa Mesa, Calif., assignor to Hughes Aircraft Company, Culver City, Calif., a corporation of Delaware Filed Aug. 1, 1963, Ser. No. 299,393
1 Claim. (Cl. 206—46)

This invention relates to a holder or carrier for miniature semiconductor devices such as diodes, transistors, capacitors, resistors, inductors, and the like.

Miniature semiconductor devices are of such small size that manual or mechanical handling thereof presents a perplexing problem because they are easily dropped and lost. Identification of such miniature devices is exceedingly difficult, if not impossible, by normal conventional means, such as stamping them with numbers, or conventionally marking them with color coded bands or dots, for example.

Accordingly, it is a primary object of this invention to provide a holder for miniature semiconductor devices.

Another object of this invention is to provide such a holder which can be stamped or marked with identifying numbers, color schemes, etc.

A further object of this invention is to provide such a holder to facilitate manual and mechanical handling of miniature semiconductor devices.

Additional objects of this invention will become apparent from the following description, which is given primarily for purposes of illustration, and not limitation.

Stated in general terms, the objects of this invention are attained by providing a holder, preferably made of a chemically inert plastic material, such as nylon. The holder preferably is made of such size and configuration that it can be handled manually or mechanically, and readily located and recovered, if dropped. In a preferred configuration, the holder is in the shape of a disc provided with a central aperture for force fitting therein a miniature semiconductor device, such as a miniature diode, transistor, etc.

In the case of a transistor, or similar unsymmetrical semiconductor devices having a top side of different configuration from its bottom side, the disc is designed so that its two sides are different in appearance. In this case, the miniature semiconductor device is mounted in the disc with the top side of the device corresponding with the top side of the disc, and the bottom side of the device corresponding with the bottom side of the disc. Also, the material of the disc preferably is transparent or translucent so that the semiconductor device mounted therein can be located over a hole in a circuit board, for example. After such location, the miniature semiconductor device can be punched from the holder directly into the circuit board to become a circuit component. Since the central aperture is located in a definite relationship to the outer periphery of the holder (usually in the center) the holder lends itself to use in equipment for the automatic insertion of semiconductor devices.

A more complete description of a specific embodiment of this invention is given below with reference to the appended drawing, wherein:

FIG. 1 is a plan view showing a holder in the form of a disc;

FIG. 2 is a side view of the holder of FIG. 1; and

FIG. 3 is a cross sectional view of the holder of FIG. 1 taken along line 3—3.

The holder 10 shown in the drawing is a round, flat disc made of a chemically inert plastic material, such as nylon. A counter-sunk hole 11 is located in the center of the disc 10 and is made of the proper dimension for insertion therein of a miniature semiconductor transistor 15. The diameter of the hole 11 is made slightly smaller than the diameter of the miniature transistor 15 so that a forced fit is affected between the disc 10 at the hole 11 with the transistor. This hole 11 need not be round, but may be square, triangular, or may be serrated to afford better gripping of the miniature transistor 15. The hole 11 is counter-sunk at 12 to facilitate insertion and force fitting of the transistor 15 into the hole 11. The thickness of the disc 10 is made so that both the top and bottom ends of the transistor 15 are exposed. In this manner the making of electrical contacts on the transistor 15 for testing the same, is facilitated. The transistor can be cleaned by the use of abrasives or chemicals without detrimentally affecting disc 10.

A notch 13, of any suitable configuration, is provided in the outer edge of the holder 10 to indicate the orientation of the miniature transistor 15 in the holder. Notch 13, which can be square, circular, elliptical, triangular, etc., serves the useful purpose of orienting the holder for feeding it into marking equipment, and serving to indicate the orientation of the miniature transistor 15, or similar unsymmetrical semiconductor device. Top and bottom orientation of transistor 15, or similar semiconductor unsymmetrical devices, is provided by beveling the edge on one side of disc 10, as indicated at 14 in FIGS. 2 and 3. The unbeveled edge serves to identify the top, or upper side of disc 10, and at the same time identifies the top, or upper end of the transistor 15, or other miniature unsymmetrical device mounted in the holder 10.

Identification of the device mounted in the holder is accomplished by stamping an identifying number into the holder. In this manner a number is applied to the transistor or other miniature semiconductor device and holder, which will not be obliterated or lost by handling or chemical or abrasive cleaning operations subsequently applied to the semiconductor device.

If desired, other notches, in addition to notch 13, can be formed into the edge of holder 10, having the same or different configurations to identify various types of devices for mechanical handling. In this manner miniature semiconductor devices can be tested, cleaned, and moved from place to place manually or mechanically, without risking their loss or transposition and without detriment thereto.

Obviously many other modifications and variations of the present invention are possible in the light of the above teachings. It is therefore to be understood that within the scope of the appended claim the invention can be practiced otherwise than as specifically described.

I claim:

The combination which consists of a disc of translucent nylon and a miniature semiconductor device mounted in the disc, said disc having a central aperture dimensioned for force fitting of the miniature semiconductor device therein and a notch in the edge thereof for orienting the holder and semiconductor device combination for automatic mechanical handling, the thickness of said disc and said semiconductor device being made substantially equal to expose the outer ends of the semiconductor device for establishment of electrical contacts thereto for testing purposes and for cleaning the exposed ends by the use of abrasives and chemical cleaners, and said disc having an edge beveled for distinguishment of one side from the other side thereof.

References Cited by the Examiner

UNITED STATES PATENTS

| | | | |
|---|---|---|---|
| 1,618,027 | 2/27 | Vogler | 211—60 |
| 1,665,214 | 4/28 | McGraw | 206—46 |
| 2,929,511 | 3/60 | Josephson | 211—60 |

FOREIGN PATENTS

| | | |
|---|---|---|
| 197,544 | 5/23 | Great Britain. |

THERON E. CONDON, *Primary Examiner.*